United States Patent
Mohammed et al.

(10) Patent No.: US 7,539,733 B2
(45) Date of Patent: *May 26, 2009

(54) REMOTE ASSISTANCE

(75) Inventors: Mazhar Mohammed, Sammamish, WA (US); Avronil Bhattacharjee, Bellevue, WA (US); Justin Kwak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 710 days.

This patent is subject to a terminal disclaimer.

(21) Appl. No.: 11/215,527

(22) Filed: Aug. 30, 2005

(65) Prior Publication Data

US 2005/0289226 A1 Dec. 29, 2005

Related U.S. Application Data

(63) Continuation of application No. 09/968,382, filed on Oct. 1, 2001, now Pat. No. 6,973,482.

(51) Int. Cl.
*G06F 15/16* (2006.01)
(52) U.S. Cl. .................. 709/208; 709/202; 709/223; 709/229; 713/182; 713/187; 713/189; 713/190
(58) Field of Classification Search ......... 709/208–211, 709/223, 229, 226–227; 713/182, 187, 189, 713/190, 191
See application file for complete search history.

(56) References Cited

U.S. PATENT DOCUMENTS

| 5,367,667 | A | 11/1994 | Wahlquist et al. |
| 5,923,756 | A | 7/1999 | Shambroom |
| 6,173,332 | B1 | 1/2001 | Hickman |
| 6,263,363 | B1 | 7/2001 | Rosenblatt et al. |
| 6,266,774 | B1 | 7/2001 | Sampath et al. |
| 6,289,378 | B1 * | 9/2001 | Meyer et al. ................. 709/223 |
| 6,327,579 | B1 * | 12/2001 | Crawford .................... 705/400 |
| 6,338,138 | B1 | 1/2002 | Raduchel et al. |
| 6,360,253 | B1 | 3/2002 | Feeny |
| 6,389,426 | B1 * | 5/2002 | Turnbull et al. ............. 707/102 |
| 6,445,907 | B1 * | 9/2002 | Middeke et al. .......... 455/226.1 |
| 6,493,824 | B1 | 12/2002 | Novoa et al. |
| 6,505,245 | B1 | 1/2003 | North et al. |
| 6,513,013 | B1 | 1/2003 | Stephanou |
| 6,594,686 | B1 | 7/2003 | Edwards et al. |
| 6,609,151 | B1 | 8/2003 | Khanna et al. |
| 6,650,747 | B1 | 11/2003 | Bala et al. |
| 6,658,466 | B1 | 12/2003 | Ellestad et al. |
| 6,754,707 | B2 | 6/2004 | Richards et al. |
| 6,760,722 | B1 * | 7/2004 | Raghunandan ................. 707/3 |

(Continued)

*Primary Examiner*—Saleh Najjar
*Assistant Examiner*—Faruk Hamza
(74) *Attorney, Agent, or Firm*—Merchant & Gould, P.C.

(57) ABSTRACT

Systems and methods for remote assistance. A user computer is able to generate a ticket that includes temporary credentials for a remote assistance account of the user computer. The ticket is escalated to an expert, who activates the ticket and requests a connection with the user using the encrypted credentials. The user can accept this request if the credentials are validated and provide the expert with a view of the user's desktop. The expert, if necessary, can request control of the user computer and the user can either grant or deny this request. If granted, the user computer can unilaterally terminate the control that was provided to the expert. Because the credentials in the ticket are encrypted, the expert does not know the actual password to the remote assistance account and can only access the user computer interactively.

7 Claims, 5 Drawing Sheets

U.S. PATENT DOCUMENTS

| | | |
|---|---|---|
| 6,834,112 B1 | 12/2004 | Brickell |
| 6,928,464 B2 * | 8/2005 | Appiah et al. ............... 709/204 |
| 2001/0053688 A1 * | 12/2001 | Rignell et al. ............... 455/414 |
| 2002/0087650 A1 | 7/2002 | Fagerburg et al. |
| 2003/0139962 A1 * | 7/2003 | Nobrega et al. ................ 705/9 |
| 2004/0039804 A1 * | 2/2004 | Carr et al. ................... 709/223 |
| 2004/0260704 A1 * | 12/2004 | Moore ........................ 707/100 |
| 2005/0044232 A1 * | 2/2005 | Keane ........................ 709/227 |
| 2005/0091359 A1 * | 4/2005 | Soin et al. ................... 709/223 |

* cited by examiner

REMOTE ASSISTANCE

CROSS-REFERENCE TO RELATED APPLICATIONS

This application is a continuation of application Ser. No. 09/968,382, filed Oct. 21, 2001, and entitled "REMOTE ASSISTANCE" and which is incorporated here by reference.

BACKGROUND OF THE INVENTION

1. The Field of the Invention

The present invention relates to systems and methods for remotely providing a user with assistance. More particularly, the present invention relates to systems and methods for providing remote assistance to a user by allowing an expert computer to access and control a user computer.

2. Background and Relevant Art

Today, computers are found in practically every home, are an integral part of our educational system, and are an indispensable business tool. Computers are used for everyday tasks such as word processing, record management, weather prediction, Internet access and browsing, game playing, email, and much more. Without the advantages afforded by computers, our lives would be more complicated and many people would be unable to perform their jobs.

In spite of these facts, many of the people that use computers on a daily basis do not have a functional understanding of their computers. If something goes wrong with their computer, they often do not have the technical skills needed to solve their problem. This is partly attributable to the fact that computers are complex devices and that most people are not accustomed to fixing computers. In many companies, for example, computers are often managed by a system administrator. When a problem occurs with a particular computer, the system administrator is called to fix the problem. This typically requires the system administrator to go to wherever the user's computer is located and can cost the user valuable time while waiting for the system administrator. If several problems occur on various computers, it is easy to see that some time may elapse before all of the problems can be addressed by the system administrator.

Many home users, on the other hand, do not have the luxury of a system administrator. Fortunately, home computers are often pre-configured for the user such that the user is only required to connect the various components of the computer system and provide power. The ability to use a computer out of the box is an important attribute for many users because they are often accustomed to simply double clicking on an icon instead of configuring their hardware or their software. In other words, people are accustomed to simply using computers and software rather than fixing them when a problem occurs.

Word processors, for example, typically present an icon to the user that the user can select in order to begin the word processor. From the user's perspective, a blank page appears on their display and they are able to enter text, save a document, print a document, or perform other tasks from within the word processor. The user is not aware that the word processor is in communication with an operating system that will permit these basic functions, such as printing a document and saving a document to disk, to be performed. The user is often unaware of the complexity of an operating system and of the various applications that execute on a computer that permit the user to operate their various software programs.

In any case, there comes a time for practically every computer user, when their computer will not operate or function as expected. In these situations, the user may require help or assistance from another person or entity. Computer manufacturers and software providers usually provide assistance to their users in several ways. Some providers have a web site that a user can access. The web site will usually provide a trouble shooting section that describes typical problems that a user may experience. It is unlikely, however, that the web site is able to adequately describe every potential problem that a user may experience. In addition, the web site presumes that a user is familiar with appropriate terms and language such that an adequate search of the web site may be performed by the user. Even if a user is able to find the relevant portion of the web site, there is the possibility that the user will not perform the actions suggested by the website for fear of causing additional problems with their computer.

Hardware and software providers also provide a telephone number that a user can call for assistance. This approach, however, faces some of the same problems. The person providing assistance (the expert) has the disadvantage of not being able to see the user's computer. The expert also faces a language barrier in the sense that the user is often unable to adequately describe what is happening to the computer. From this perspective, providing support services to a user can be frustrating for both the user and the expert. The expert has difficulty in ascertaining the computer's problem while the user does not have an operating computer and is often unable to adequately describe the problem to the expert.

If a problem occurs with the computer, some users will not be able to correct the problem and will require help or assistance. As previously mentioned, a web site or a telephone call often results in frustration because a solution is not reached. Other potential solutions, such as terminal sessions, video conferencing, and the like require the user to configure their computer to accept these types of solutions. In other words, the user is expected to configure a computer that they are having trouble with in the first place.

In one example, the user is required to establish credentials that will allows a remote expert to access their computer. However, this presents a security risk to the user because the user cannot easily terminate the expert's access and the user is not always aware of the actions being taken by the expert.

SUMMARY OF THE INVENTION

The present invention recognizes the limitations of the prior art and the need for systems and methods that are able to provide assistance to users in a manner that overcomes these limitations. The present invention which relates to systems and methods for providing remote assistance to a user or to remotely providing a user with support services. Remote assistance allows two computers to establish a connection over a network such as for example the Internet and permits one of those computers to remotely view and trouble shoot the other computer. Remote assistance can be provided in this manner without requiring the user to configure their computer for a particular network or establish credentials for each potential expert.

When a user requires assistance or seeks support services from an expert, the user computer generates a ticket that includes credentials. The credentials allow access to a remote assistance account of the user's computer. The expert, however, does not ever have possession of the complete credentials because the expert only receives an encrypted password to a remote assistance account even though, in one example, the session identifier is not encrypted. The ticket also includes an IP address and port data such that a connection can be established between the expert computer and the user computer. The ticket is sent or escalated to the expert computer using a variety of different transport mechanisms such as email, instant messaging, and the like. When the expert computer receives the ticket, the expert is able to select or activate the ticket which results in the expert computer initiating a connection with the user computer.

The user computer thus receives a call from the expert computer in which the expert computer requests a connection with the user computer. This addresses privacy and security concerns and places control of the connection with the user computer because the user must be present to accept the connection request. If the user accepts the connection request, then a connection is established between the user computer and the expert computer.

Once a connection is established and the credentials are validated or verified, a shadow session is established that only permits the expert to view the desktop of the user computer. A message box on both the user computer and the expert computer permits communication between the user and the expert. Alternatively, other communication methods, such as the telephone, can be used. In any event, the expert is able to view the desktop of the user. This provides a common reference and enables the expert and the user to communicate more effectively because the expert can view the actions of the user, view any error messages that may appear on the desktop or screen of the user's computer, and the like.

The expert also has the ability to request that the user grant control of the user computer to the expert. If this control request is granted, then the expert is enabled to control the user computer remotely. This enables the expert to provide rich collaboration and support services to the user and allows the user to observe and ask questions. The user can resume control of the user computer and terminate the control of the expert, for example, by pressing a predetermined key.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
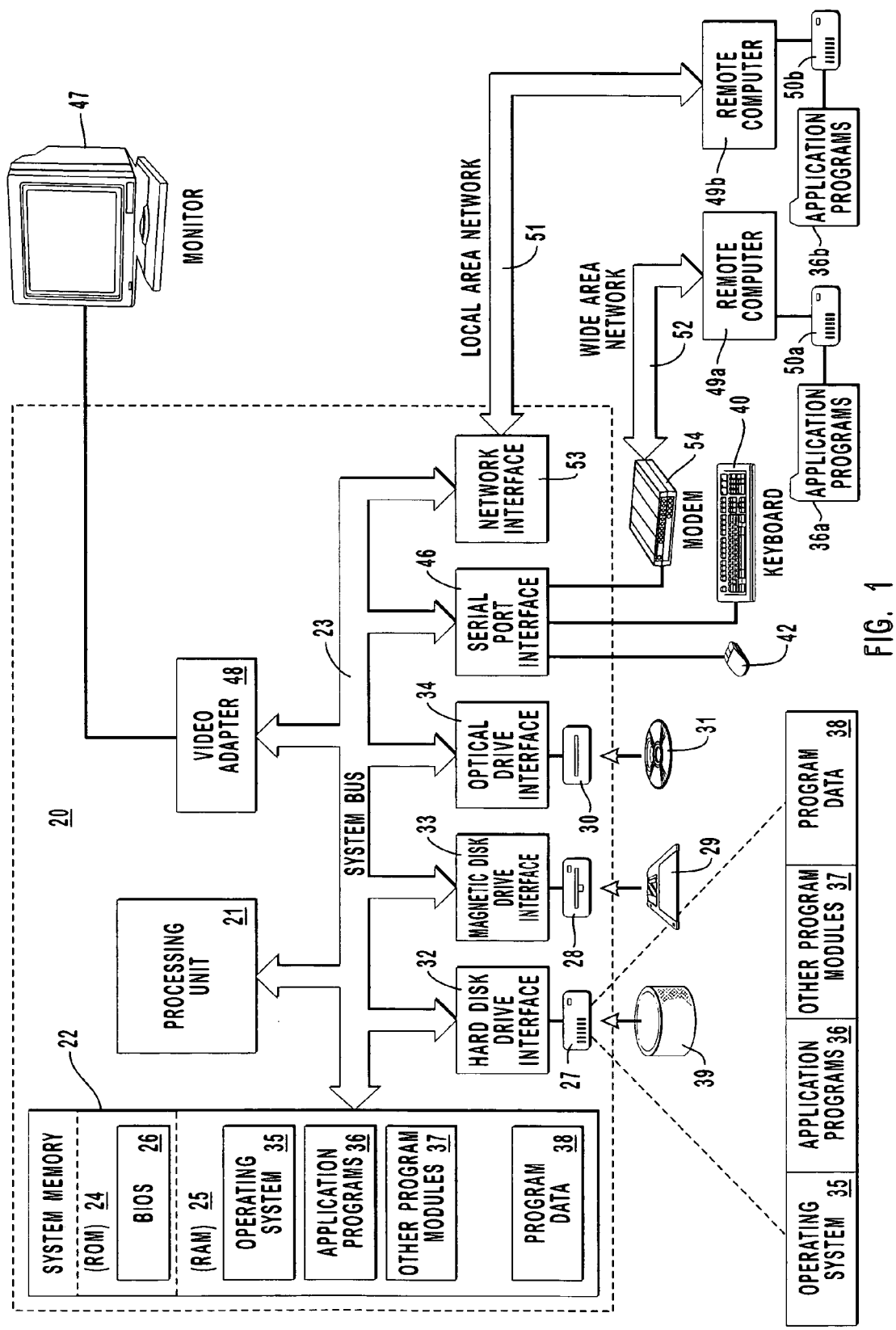
FIG. 1 illustrates an exemplary system that provides a suitable operating environment for the present invention.

Remote assistance provides several advantages and overcomes previous limitations by allowing corporate support services, support engineers, friends or peers to remotely interact and collaborate with a user. Improved help and support experiences between two parties is achieved by enabling at least one of the parties to view and/or control the desktop or computer of the other party. In addition, remote assistance also provides for text based communication, voice communication, file transfer, and the like to facilitate and improve the support experience.

As previously stated, providing remote assistance was difficult for several reasons. For example, establishing secure control of a remote computer was complicated because shared credentials that enable one user to temporarily login to a remote computer and exit the remote computer when requested by the remote user do not exist. Also, some software solutions require that temporary credentials be established for both parties before any connection is attempted. The present invention does not require that temporary credentials be established for the expert in order to create a connection between two computers.

Remote assistance often occurs in the context of customer support. When a provider sells hardware and/or software to a customer or a user, both the hardware and software providers typically have support services whose function is to help customers or users with the problems that they may experience with their hardware or software. The present invention is useful in the context of customer support because the provider (expert) is able to establish a connection with the customer (user) and remotely trouble shoot the user's computer by viewing and/or controlling the user's computer.

When an expert is able to remotely view and/or control a user's computer, there are at least two immediate benefits: (1) the user's problem can usually be resolved more quickly and (2) the user is educated about their computer by being able to view how the expert solves their problem. Another advantage of the present invention is that it can be customized and branded by various support services and can be integrated with existing applications such as email and instant messaging.

The present invention extends to both systems and methods for providing remote assistance from the perspective of both a user and an expert. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

As used herein, "support services" refers to the help or assistance that is provided by an expert to a user. An expert provides support services or remote assistance to a user, for example, by answering their questions, troubleshooting their hardware/software, accessing the user's computer, controlling the user's computer, solving the user's problems, and the like or any combination thereof. As used herein, "expert" refers to those persons or entities that provide assistance or help to "users." An expert can be a friend, corporate support services, a support engineer or any other entity or person that assists a user as described herein. A "user" is the person or entity that is seeking support services or remote assistance. Thus, when a user requires help or assistance they seek support services from an expert. The terms expert and user, however, can also refer to computers or servers over which the remote assistance is provided. Remote assistance, as used herein, refers to providing assistance by an expert to a user over some type of connection. Often, remote assistance is provided over the Internet. In one specific example, remote assistance uses Remote Desktop Protocol (RDP), which provides remote display and input capabilities over a network. In another example, remote assistance uses terminal services or terminal services advanced client (TSAC), which uses an ActiveX control.

Figure 2:
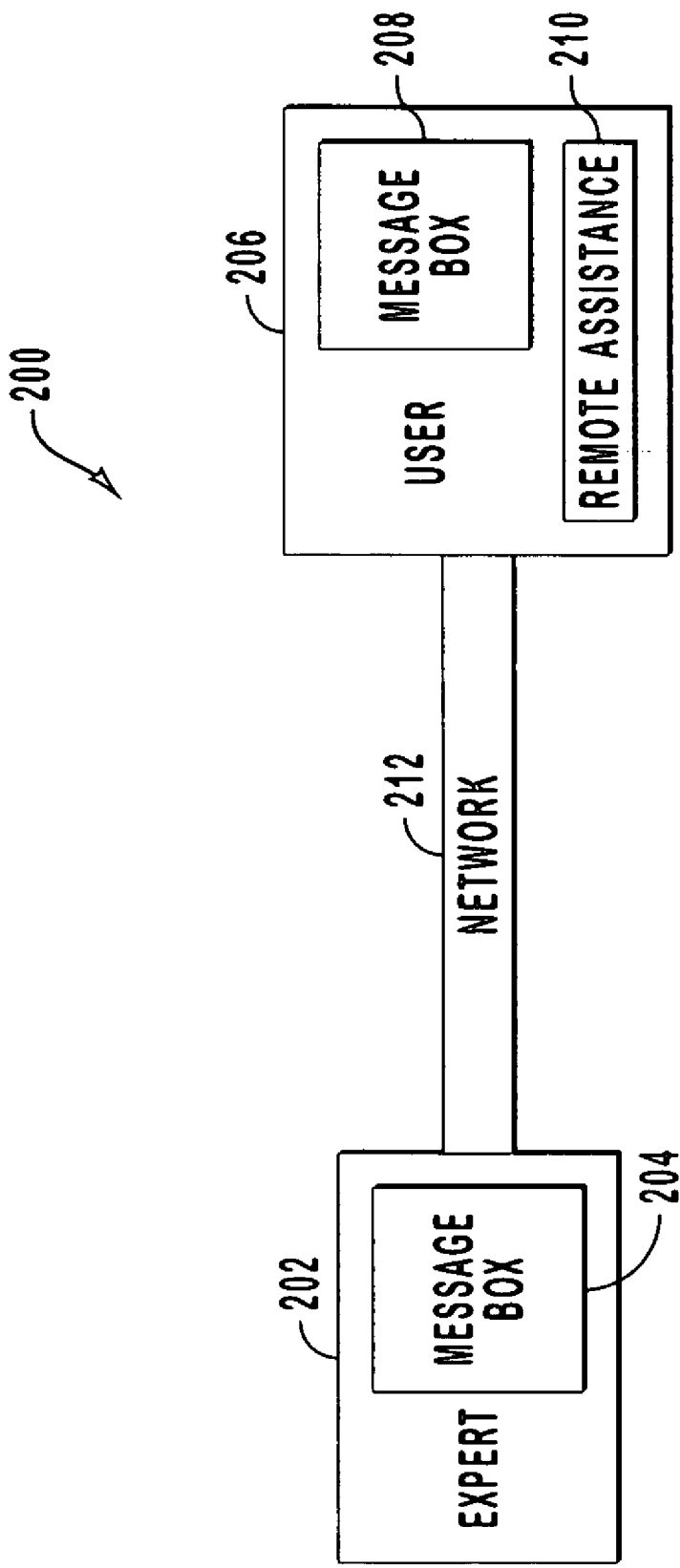
FIG. 2 generally illustrates a user computer that is receiving remote assistance from an expert computer.

FIG. 2 is a block diagram that generally illustrates an exemplary environment in which the systems and methods of the present invention may be implemented and practiced. The present invention will also be described in the context of customer service or support, but it is understood that the invention is not limited to customer service scenarios because the user can seek remote assistance from a friend, for example. More generally, the present invention relates to remote access to a computer. FIG. 2 illustrates an expert computer 202 and a user computer 206 and in this example, the user requires assistance or support services from an expert. Thus, the user will seek support services from the expert.

The expert, as previously mentioned, can be a corporate service center, or a friend or a family member. In some situations, the user computer 206 maintains a list of experts from which the user will select. In addition, the user is not limited to selecting a single expert, but can request remote assistance from multiple experts. This is advantageous because the user does not know if any particular expert is available when remote assistance is requested. Similarly, a single expert can provide remote assistance to more than one user.

The user computer 206 has a remote assistance module 210 through which remote assistance is initiated and accomplished. When making a connection with a remote computer such as the expert computer 202, the user may have several concerns. For example, the user does not want to provide the expert with unfettered access to the user's computer because it is possible that a malicious expert would take advantage of that kind of access.

One of the advantages of the present invention is that the expert is able to view and/or control the user's computer, but the expert has limited access to the user's computer. This is accomplished by allowing the expert to login to an account of the user computer that has minimal privileges on the user computer. In general, the expert computer is able to establish a connection over a network 212 such as the Internet with the user computer. Over the connection, the expert computer 202 is able to view and in some situations, with the permission of the user, control the user computer 206. As will be described below, the expert is able to establish a shadow session at the user computer 206 using credentials provided by the user. These credentials are not established for the expert in the sense that the expert may not be aware of the actual credentials because the expert only receives a password that is encrypted and that the expert is unable to decrypt.

After the connection is established, the expert and the user are able to communicate, for example, using textual messages (such as chat), by video, by telephone and the like. In the example of FIG. 2, the expert computer has a message box 204 that is used to communicate with the user 206, which has a corresponding message box 208. The expert and the user can send text messages, for example, using the message boxes 204 and 208.

Thus, a shadow session, which follows an active session of the user, has been created that enables the expert to view what the user is viewing while communication can occur over the message box 204 of the expert and the message box 208 of the user or over another communication scheme such as a telephone. In one example, only display, keyboard, and/or mouse information are transmitted to the expert. Because the connection between the expert and the user is often over the Internet, the desktop of the user is preferably turned off such that the background, which may be large, is not transmitted to the expert. The desktop is restored when the remote assistance is terminated.

In some situations, the expert may decide to request control of the user computer 206. If the user grants this request, then the expert can control the user computer 206 and the user will be able to view the actions that are taken by the expert. In this manner, the user is able to receive more effective support from the expert. If the user panics or is unsure of the actions being taken by the expert, the user is able to quickly terminate the control that was provided to the expert by, for example, pressing a predetermined key on the keyboard. Also, the expert typically has very low privileges on the user computer such that the user and the user computer are further protected. If a user accidentally terminates the control given to an expert, the expert can simply request that control be restored and the user has the option of either granting or denying this request.

Figure 3:
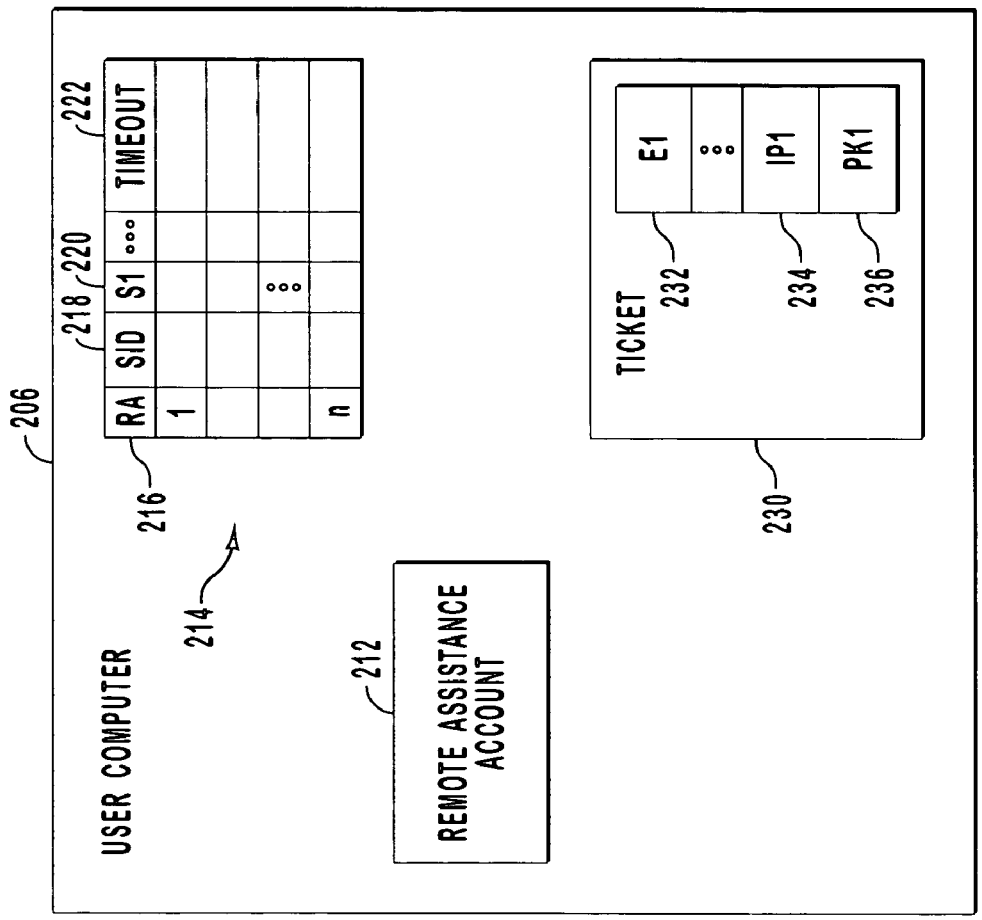
FIG. 3 is a block diagram used to illustrate a user computer that generates a ticket that will allow an expert computer to access the user computer.
Figure 4:
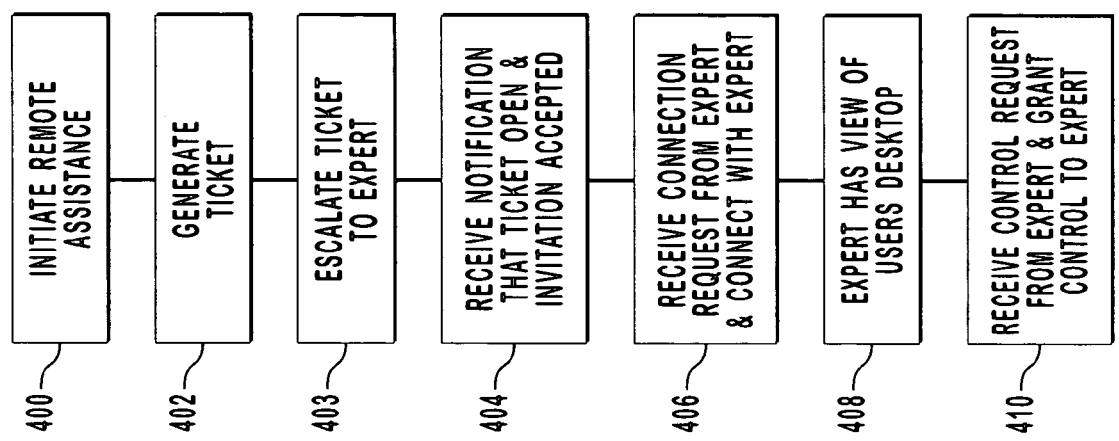
FIG. 4 is a block diagram that illustrates exemplary methods for escalating a ticket from a user computer to an expert computer.
Figure 5:
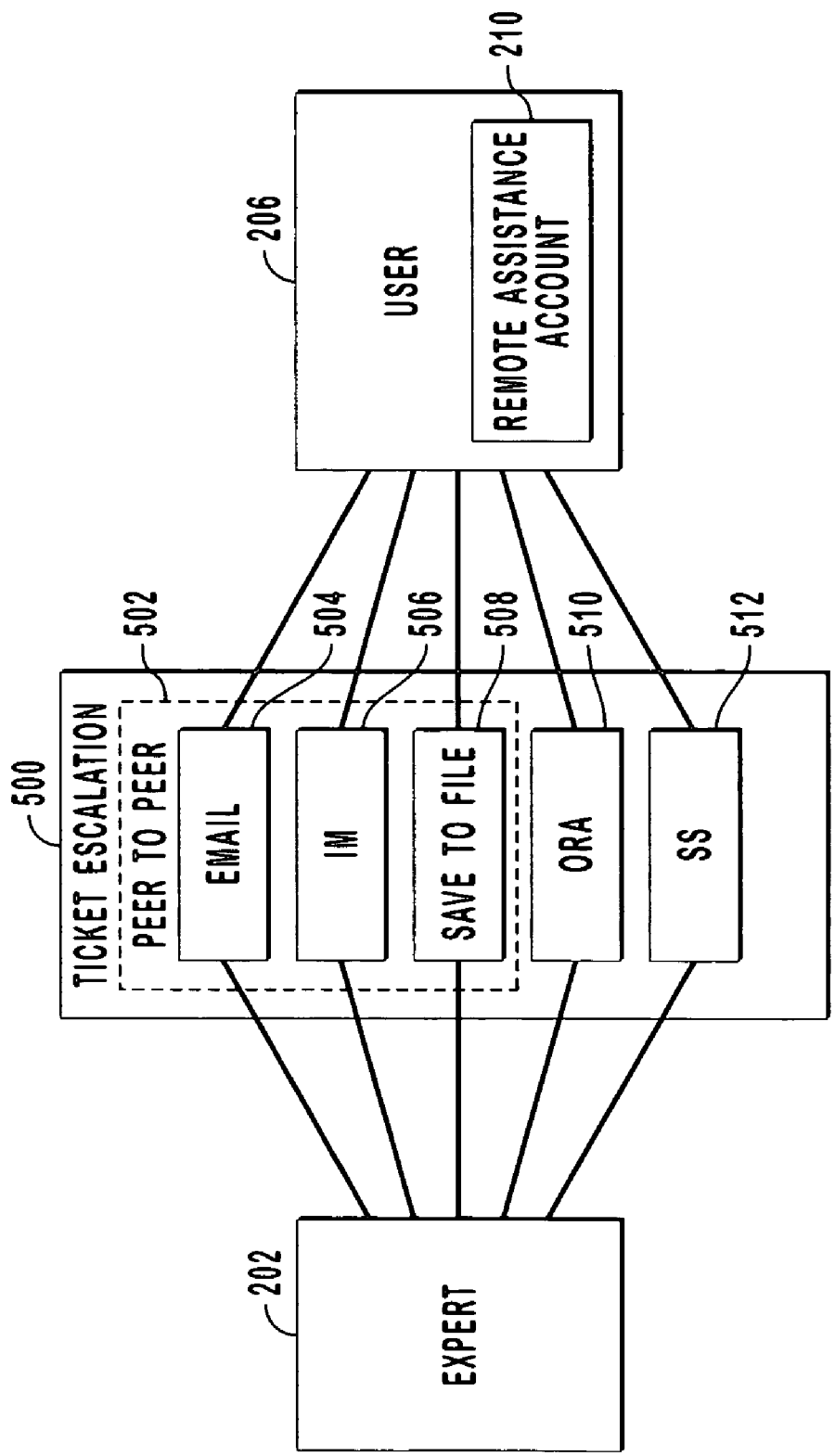
FIG. 5 is a flow diagram for an exemplary method for requesting remote assistance from an expert.

FIGS. 3, 4, and 5 are used to describe a more detailed description of remote assistance. The connection between an expert computer and a user computer is established using a ticket and FIG. 3 is a block diagram describes a ticket in the context of remote assistance. FIG. 4 is a flow diagram that illustrates an exemplary method for providing remote assistance and will be described from the perspective of both the user and the expert. FIG. 5 is a block diagram that is used to illustrate exemplary ways of escalating or transferring a ticket from a user to an expert.

FIG. 3 is a block diagram that illustrates a user computer 206 that is able to initiate a remote assistance session. The remote assistance session is initiated, for example, when the user requires assistance with their computer from an expert such as a software provider or a hardware manufacturer or other person. The user computer 206 includes a remote assistance account 212 that is initially disabled. The remote assistance account 212 is an account that is used by experts to access and login to the user computer 206. The remote assistance account 212 is only enabled when the user computer 206 has outstanding remote assistance requests. Account 212 has limited privileges on the user computer 206. The remote assistance account 212 preferably includes a strong password that is changed each time the number of outstanding remote assistance requests (support incidents) change from non-zero to zero. The remote assistance account 212 is essentially used to assist in the generation of a shadow session for use by an expert. In other words, the remote assistance account 212 is able to follow and view the active session of the user.

In the context of remote assistance, the user computer 206 maintains a table 214 to keep track of remote assistance requests or of support incidents. Each row of the table 214 thus represents a remote assistance request and each remote assistance request 216 includes, but is not limited to, a security identifier (SID) 218 of the user, a cryptographically generated session identifier (SI) 220 and a timeout value 222. The session identifier (SI) 220 is usually different for each remote assistance request or support incident. The table 214 is maintained even when the user computer 206 is rebooted. This permits, for example, an expert to easily login again in those situations when the user computer 206 needs to be booted. A key (K1) is associated with the table 214 and whenever the number of requests in the table 214 goes to zero, the key K1 is changed. Whenever a remote assistance request is completed, it is removed from the table 214. Remote assistance requests that have expired based on the timeout value 222 are also removed from the table 214.

Each of these values in the table 214 is useful for enhancing the security of the user computer 206. By changing the key each time the number of remote assistance requests goes to zero, an attempt to login by an expert that possesses an older key will fail. Also, the remote assistance account password is also changed each time the number of remote assistance requests goes to zero and an attempt to login by an expert that possesses an old password will also fail. Similarly, the timeout 222 value ensures that a particular ticket is not valid indefinitely.

Each ticket 230, which represents or is associated with a remote assistance request, includes, but is not limited to, the IP address (IP1) 234 of the user computer 206 and includes relevant port numbers, a hash of the public key (PK1) 236 of the user computer 206, and a value (E1) 232 that includes an encrypted value of K1 and of a password to the account 212. The IP1 234 is included in the ticket 230 such that the expert is able to have an address to the user computer 206 when establishing a connection. The hash of the user's public key (PK1) 236 is included such that security is enhanced by protecting against, for example, a man in the middle attack, where someone intercepts an original message and replaces the public key of the user with their own public key. The expert validates the public key being used with the public key contained in the ticket.

The value E1 232 contains temporary, encrypted credentials for use on the user computer 206. In one example, the value E1 232 includes an encryption of K1 and an encryption of the password to the remote assistance account 212. In other words, if the expert decrypts the value E1 232, they will have K1 and an encrypted password. By encrypting the password to the remote assistance account 212 before it is included in the ticket, external experts do not have the actual password to the remote assistance account 212 and are only able to access or log on to the user computer 206 interactively. In other words, the expert can only login if the user is present and logged in to the appropriate network such as the Internet. The expert thus never has actual knowledge of the password to the remote assistance account 212. When the expert decrypts the encrypted portion of the ticket, the password to the remote assistance account is still encrypted. This ensures, in this example, that the password to the account 212 never leaves the user computer 206. After the ticket is generated, it is provided or transmitted to the expert, who is able to use the ticket to establish a remote assistance session with the user.

FIG. 4 is a flow diagram that is used to discuss establishing a remote assistance session between an expert and a user. Remote assistance begins when a user initiates a remote assistance session (400). This can include, for example, selecting an expert from a list of experts or from information that is provided by a product provider such as the computer manufacturer or a software provider. Next, the user generates a ticket (402). The ticket will include the IP address of the user, as well as temporary credentials (the encrypted password to the remote assistance account and the encrypted key K1). At (403), the ticket is escalated or transmitted to an expert as described with reference to FIG. 5.

When the expert receives the ticket, it can be opened or otherwise activated and an attempt to call the user or connect with the user is automatically initiated. This is accomplished using the IP address and port data included in the ticket and by providing the encrypted credentials back to the user computer. The user receives a notification (404) or call from the expert that the ticket has been opened or activated and that the invitation to assist the user has been accepted. The expert passes in the value E1, S1 and optionally U1 (described below). Of course, the connection attempt will fail if the credentials are not correct or are invalid.

The user is also advised that the expert is attempting to connect with the user. The user has the option of accepting the connection or of refusing the connection. Thus, the connection cannot be directly established unless the user is available and accepts the connect back call from the expert. No connection is established if the user does not respond to the expert. Thus, the privacy and security of the user is preserved.

After the connection is established (406), and assuming that the credentials are valid, a shadow session is established on the user's computer during which the expert can provide remote assistance or support services to the user. While the expert is connected with the user during the remote assistance session, the expert is able to view or follow a current session of the user. Thus, any actions taken by the user (mouse movements, keyboard actions, display, and the like) are viewed by the expert. The expert is able to view what is selected by the user, what is typed by the user, which applications are open, and the like. Using remote assistance, the user can visually recreate, and the expert can view, the conditions that led to the problem being addressed by the expert. The expert can direct the user to perform certain actions and then watch the user perform those actions to ensure that they are performed correctly. The expert has visual verification that the user performed the proper actions for a given problem.

Because the expert can view the desktop of the user, the expert is also able to provide more accurate suggestions and directions to the user using the communication channel such as the message box. This alleviates the difficulty experienced by both the user and the expert when the user is only able to verbally describe the desktop to the expert. The expert is able to more easily diagnose a user's problem because the expert can view the user's desktop.

At this point, the expert is only able to view the user's desktop (408) and the expert is unable to control or manipulate the user's computer. Even with a view of the user's desktop, the ability of the expert to assist the user is enhanced because the user and the expert are each able to view what they are discussing and they have a common reference. In addition, a communication channel is established between the user and the expert. The communication channel may be a chat channel and may provide voice and/or video support. Alternatively, the communication channel may be a separate telephone connection. The communication channel enables the user and the expert to collaborate and also allows the user to more subjectively verify the identity of the expert.

At (410), the expert can request control of the user's computer. If the user grants this control request, then the expert and the user will be able to jointly manipulate the keyboard and the mouse, share files, and the like or any combination thereof. The user can terminate the control granted to the expert at any time, for example, by simply pressing a key or by pressing a certain key such as the escape key. When the expert has control of the user's computer, the expert can thus provide support services by performing actions on the user's computer (moving the mouse, typing in text or commands, opening files or applications, and the like) that solve the problem of the user or that answer the user's questions. The user is able to view the actions performed by the expert.

The ticket thus provides several security measures to both the expert and the user. When the ticket is generated, the user computer first encrypts the password to the remote assistance account and the key associated with the table before inserting them in the ticket. This prevents the expert from knowing the actual password and the key. In addition, the key will change each time the outstanding requests go to zero. Thus a request that has an old key will fail even if the password is correct. The ticket allows an expert to access a user computer and the user does not have to set up temporary credentials or reconfigure their network. The ticket eliminates these requirements and simplifies that actions taken by the user who is seeking assistance. At the same time, precautions, such as prompting the user that an expert desires to connect with the user computer, allowing the user to unilaterally terminate the control granted to the expert, limiting the privileges held by the expert, withholding the actual credentials from the expert, and the like enhance the security afforded the user.

FIG. 5 is a block diagram that illustrates exemplary forms of ticket escalation and is discussed in the context of remote assistance. Ticket escalation refers to generating tickets as well as to securely transferring tickets from user computers to expert computers or from users to experts. In some situations, a ticket may be generated by the expert. FIG. 5 is used to illustrate how a connection is established while preserving the interest of both the expert and the user.

There are several situations or scenarios where ticket escalation may occur. These situations vary according to the relative locations and security of experts and users. Experts and users, for example, can be either on the Internet, in a LAN, behind a firewall, behind a Network Address Translation (NAT), and the like. For example, the expert and the user may both be on the Internet or either the expert or the user will be behind a firewall. In some situations, both the expert and the user will be on an Intranet or on a home network, which is similar to an Intranet. In another situation, the user is behind a firewall, the Expert is on the Internet, but the support services provided by the expert are outsourced to a third party. Alternatively, the user is behind a NAT. Also, remote assistance may be required through corporate firewalls where users are behind generic firewalls. In each of these and other situations, the ports over which communication is performed are manipulated to accommodate each situation.

FIG. 5 thus illustrates an expert computer 202 and a user computer 206. When a user computer 206 requires remote assistance, a remote session request is generated and a ticket is produced. The ticket is then escalated to the expert computer 202 using ticket escalation 500. One particular type of ticket escalation 500 is peer to peer ticket escalation 502 that includes, but is not limited to, email 504, instant messaging (IM) 508 and save to file (STF) 508. In peer to peer ticket escalation 502, the expert and the user are able to interact directly and may not require an intermediary server.

In the case of email 504, the ticket is often included as an attachment to the email. The expert simply opens the attachment and a connection with the user computer is automatically established as described with reference to FIG. 4. In the case of IM 508, the expert receives the ticket and is able to open or otherwise activate the ticket. With STF 508 ticket escalation, the ticket is saved to a file that the expert is able to retrieve and open. In all cases when the expert opens, executes or otherwise activates the ticket, a call back to the user computer 206 is initiated by the expert computer 202 using the data/credentials provided in the ticket.

Another form of ticket escalation 502 is Offer Remote Assistance (ORA) 510. ORA 510 ticket escalation differs from other types of ticket escalation in the sense that the expert is able to initiate the remote assistance session and pull a ticket from the user computer 206, as opposed to the user generating the ticket and sending the ticket to a particular expert. ORA 510 ticket escalation often occurs, for example, within a corporation over a local area network.

For example, in ORA 510 ticket escalation, a user may receive an unsolicited remote assistance request without the user generating a support incident or a ticket. In this case, the expert, who is usually an administrator, makes a call to the user's computer. The user computer checks to determine if the expert is with a designated group such as an administrators group. If true, then a ticket is generated by the user computer and the remote assistance session will occur as previously described.

Support services (SS) 512 ticket escalation often occurs, for example, in situations where a product provider is providing support services to their customers. It is often undesirable for a user to have a direct connection with a support engineer, which would effectively make the engineer's computer part of the user's domain and subject the engineer's computer as well as the providers network to a security risk. In this situation, the provider will often provide a terminal server that is outside of the provider's firewall. When a user requires remote assistance, the user and the support engineer both login to the terminal server. By establishing a connection through a terminal server, the network of the support engineer is protected and the user will still receive assistance with their computer.

In another situation, the user computer 206 is often behind a NAT and only the IP address of the firewall or of the gateway is visible to external parties. This situation can also be addressed by having a well known server function as a broker between the user and the expert. By using the broker server, the connection can be established independent of whether the user or the expert initiated the connection because once the connection is established, the remote assistance session will proceed as previously described.

The present invention further contemplates additional security for both the user and the expert in some situations. For example, when both the user and the expert are on the Internet, it is often difficult to authenticate another user. In this example, the user may provide an extra password or a shared secret that is shared between the user and the expert. The user's computer generates a cryptographic challenge C1 and the user's computer stores an encrypted value U1 that includes both the shared secret and C1 in the table that was previously described with reference to FIG. 3.

C1 is added to the support incident or ticket, which is sent to the expert. The expert generates a second value U2 that is an encryption of the shared secret or extra password and C1. The value U2 is sent back to the user. The user computer then verifies that U2 is the same as U1. If they are not equal, then the login fails.

More generally, escalating a ticket to an expert and logging in the expert occurs as follows. For a remote assistance request, a ticket or support incident is generated that contains E1, which includes an encrypted (K1, Password), and an unencrypted S1. Note that the password was already encrypted before it was included in the ticket. The ticket also includes a hash of the user's public key (PK1) and other information as described previously. The expert receives the ticket over some escalation mechanism.

The expert then attempts to connect using the IP address which was also included in the ticket. At this point, the expert and the novice establish a secure RDP session using the public key of the user. Then, the expert passes in the values E1, S1, and optionally U1. The user decrypts the password by decrypting (K1, E1) and attempts to login to the remote assistance account. If the password is incorrect, the login fails. Also, S1 is verified as a valid entry in the table. If there is no match for S1, then the login fails. If the login is successful, then the expert is attached to the session corresponding to the session identifier in the table as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A client computer in a system that includes the client computer and an expert computer connected with a network, wherein a user of the client computer requires support services for the client computer and an expert provides support services to the user, the client computer comprising one or more computer readable storage media having computer-executable instructions for implementing a method for requesting support services from the expert that permits a computer controlled by the expert (expert computer) to control the user computer and such that the user receives support services from the expert, wherein the method comprises:

a step for generating a ticket on the client computer, the ticket including credentials that permit the expert computer to login to the client computer at the user's request, the credentials including at least an encrypted portion that includes at least an encrypted password;

a step for escalating the ticket to the expert computer which initiates a user request for remote assistance for support services from the expert computer, and wherein the expert computer is unable to decrypt the password even upon decrypting the encrypted portion of the credentials;

in response to the user initiated request for remote assistance, a step for receiving a connection request from the expert computer indicating that the expert computer desires to connect with the user computer, the request to connect including the credentials;

a step for accepting the connection request upon verifying the credentials by at least decrypting the password, and wherein upon accepting the connection request the expert computer is provided a view of a desktop of the client computer without initially being provided to control of the client computer; and upon subsequently receiving a control request from the expert computer to remotely control the user computer over the network, a step for selectively providing control of the client computer to the expert computer, such that the expert computer controls the client computer, but wherein the user is provided an option to unilaterally terminate the selective control.

2. A client computer as defined in claim 1, wherein the step for generating a ticket on the user computer further comprises an act of generating a key that is associated with a table that maintains outstanding remote assistance requests, wherein an encrypted version of the key is included in the ticket and wherein the key is unknown to the expert computer.

3. A client computer as defined in claim 1, wherein the ticket comprises a hashed value of a public key of the client computer, wherein the expert computer validates the public key of the user to insure that the expert is assisting the user that generated the ticket.

4. A client computer as defined in claim 1, wherein the step for escalating the ticket to the expert computer further comprises one or more of:

transmitting the ticket in an email to the expert;
    transmitting the ticket to the expert over instant messaging; and
    transmitting the ticket to the expert by saving the ticket to a file.

5. A client computer as defined in claim 1, wherein the step for escalating the ticket to the expert computer further comprises:

a step for receiving an unsolicited call from the expert; and
    a step for determining that the expert is in a designated group maintained on the client computer.

6. A client computer as defined in claim 1, wherein the step for providing control of the client computer to the expert computer such that the expert is provided the option to view and control the user computer further comprises a step for allowing the user to unilaterally terminate the control granted to the expert computer by selecting a predetermined key at the client computer.

7. A client computer as defined in claim 1, wherein the step for accepting the connection request such that the expert computer is provided the option to view a desktop of the client computer but cannot control the client computer further comprises establishing a shadow session on the user computer, wherein the expert has limited privileges on the client computer.

* * * * *